Jan. 7, 1958
G. L. CLAPPER
2,819,413
PULSE GENERATING SYSTEM
Filed July 25, 1955
2 Sheets-Sheet 1
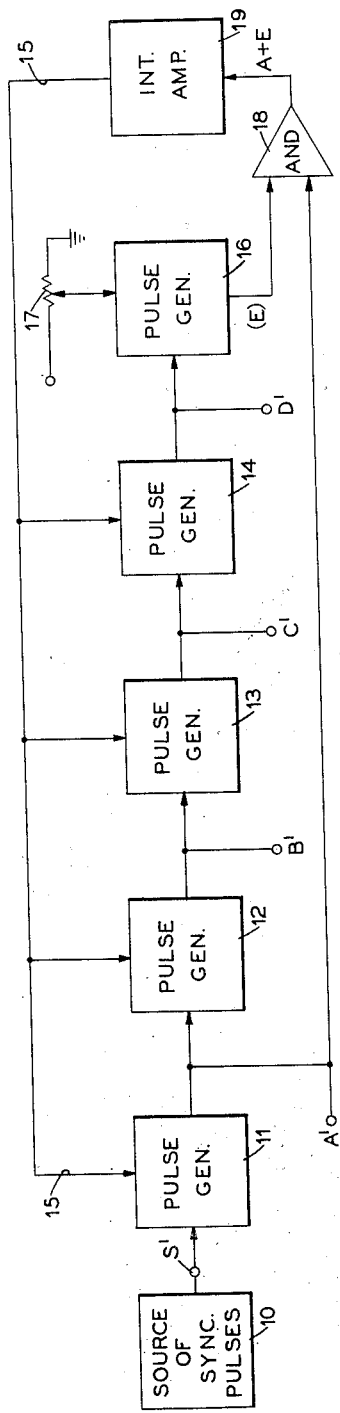
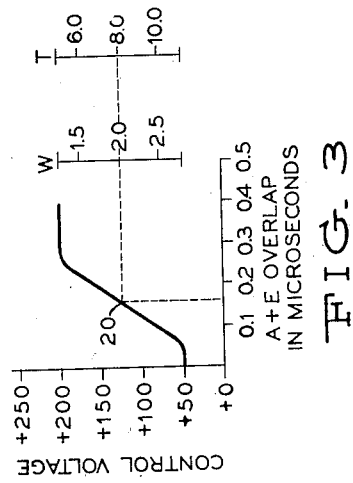
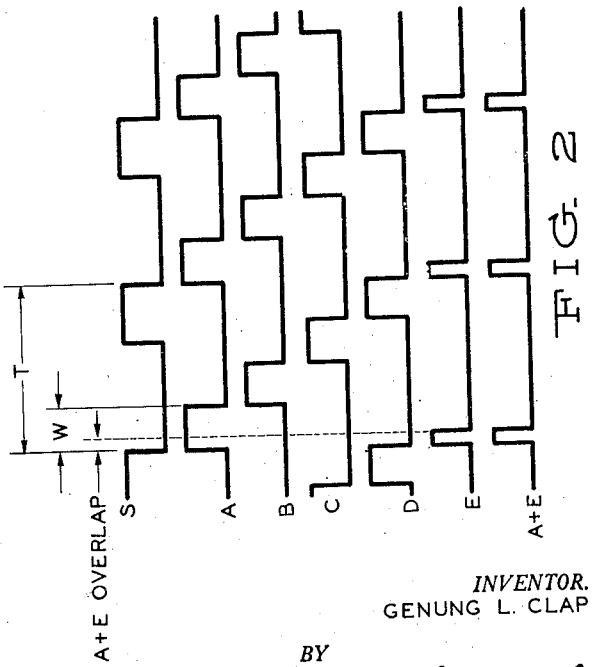
INVENTOR.
GENUNG L. CLAPPER
BY
Dewey J. Cunningham
ATTORNEY Jan. 7, 1958     G. L. CLAPPER     2,819,413
PULSE GENERATING SYSTEM
Filed July 25, 1955     2 Sheets-Sheet 2

INVENTOR.
GENUNG. L. CLAPPER
BY
Dewey J. Cunningham
ATTORNEY

United States Patent Office 2,819,413
Patented Jan. 7, 1958

2,819,413

PULSE GENERATING SYSTEM

Genung L. Clapper, Vestal, N. Y., assignor to International Business Machines Corporation, New York, N. Y., a corporation of New York Application July 25, 1955, Serial No. 524,172

11 Claims. (Cl. 307—106)

This invention relates to novel pulse circuits and timing systems having particular application to high speed electrical devices, and more particularly relates to improved circuit means for producing timing pulses.

An object of the invention is to provide novel circuit means responsive to recurring pulses for generating additional pulses at equally spaced intervals during the cycle time of said recurring pulses.

Another object of the present invention is to furnish improved circuit means responsive to recurring pulses which may vary in their pulse repetition rate for generating timing pulses at equally spaced intervals between said recurring pulses.

Still another object of this invention is to produce a plurality of equal width pulses between adjacent pairs of pulses obtained from a recording medium which is susceptible to velocity variations.

A further object of the invention is to furnish an improved circuit means for producing pulses delayed for different predetermined portions of an interval between recurring pulses obtained from a recording medium which may vary in velocity.

A still further object of this invention is to provide means for producing a plurality of separate trains of pulses at the same pulse repetition rate as that supplied to said means from the timing track of a magnetic drum which is susceptible to velocity variations, the pulses in said separate trains occurring at different intervals of time.

Other objects of the invention will be pointed out in the following description and claims and illustrated in the accompanying drawings, which disclose, by way of examples, the principle of the invention and the best mode, which has been contemplated, of applying that principle.

In the drawings:

Fig. 1 is a block diagram of the present invention;

Fig. 2 shows a plurality of sample wave-forms which may be produced at different points in the diagram shown in Fig. 1;

Fig. 3 is a plot showing the effect of a variable repetition rate of input pulses on the control voltage necessary to adjust the circuit of Fig. 1 to produce the proper width output pulses;

Figure 4:
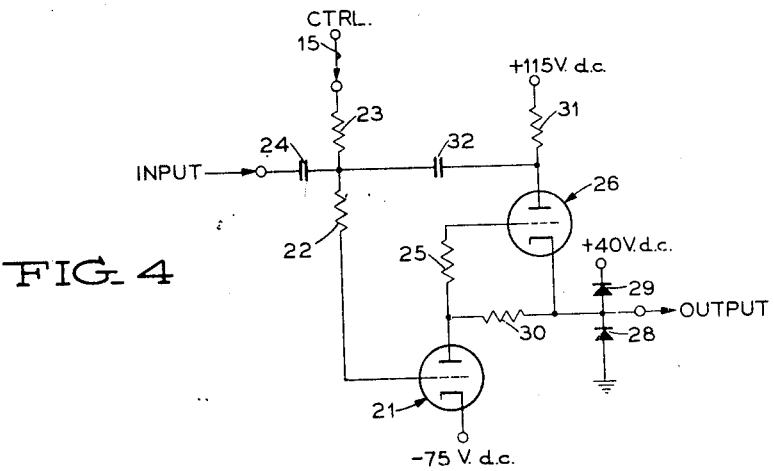
Figs. 4 and 5 are schematic diagrams of the two forms of pulse shaping circuits shown in block diagram form in Fig. 1.

Computing machines and other electronic devices dealing with pulse trains normally require some means for synchronizing the pulse trains so that various operations utilizing one or more of said pulse trains may be carried out. For example, it may be desired to record a pulse train on some storage medium such as a magnetic drum where the information in the pulse train is placed on the drum in the form of magnetized spots or bits of information. Frequently, a drum possesses a plurality of tracks so as to store a large quantity of information. In order to synchronize the operation of various circuits which are to supply the pulse trains to the drum with the speed of rotation thereof, one of the tracks on the drum is generally used as a sync or timing track.

A method often used to furnish a sync track is to record a plurality of magnetized spots at equal spacings around the periphery of the drum. These spots are sensed by a read head and the signals generated therefrom are applied to appropriate amplification and pulse shaping circuits. These circuits provide a series of equally spaced timing pulses. The repetition rate of these timing pulses will have a correlation with the speed of rotation of the drum, and thus can be used to control the writing or reading of information on the drum.

It is not unusual for there to be a requirement of additional timing pulses which may or may not be at the same repetition rate as the basic sync pulses. If these additional timing pulses are at the same frequency, they usually bear different time relationships to the basic sync pulses. That is, they may begin and end at times different from each other and from the basic sync.

Since storage space on a magnetic drum is at a premium it is undesirable to so load the drum with sync tracks that there is little space left for information storage. Therefore, the basic sync track may be used to furnish pulses to additional circuitry for producing the desired additional sync sources. Such an arrangement is satisfactory as long as the drum furnishing the basic sync pulses is rotated at a constant velocity. However, when the angular velocity changes due to power supply variations, belt wear, bearing wear and the like, the sync pulses supplied by the said additional circuitry will not bear the proper correlation to the basic sync source from the drum.

The present invention is in the form of a circuit which receives recurring pulses from a source, such as the sync track of a magnetic drum, and produces a predetermined number of additional sync pulses at spaced intervals between adjacent basic sync pulses. This spacing is maintained even though the repetition rate of the basic sync pulses changes. That is, even though the cycle time T between the leading edges of adjacent basic sync pulses changes, the width W of the additional sync pulses will vary accordingly so that all will occur within the time T during which they are generated.

Briefly, the invention comprises a plurality of serially arranged pulse generating circuits, there being one of such circuits for each auxiliary sync pulse desired. The basic sync pulse is used to initiate the first pulse generator to produce an output pulse of a particular duration which is dependent on the amplitude of an externally applied control voltage. The second pulse generator is initiated by the trailing edge of the output pulse from the first generator and provides an output pulse of the same duration as the output pulse from the first generator. This is due to the fact that the second generator is controlled by the same control voltage as the first generator. The remaining generators operate in similar fashion. If the proper control voltage is being used, the trailing edge of the output pulse from the last generator should be aligned with the leading edge of the next sync pulse. To assure this alignment, a means for generating the control voltage is provided which comprises an additional pulse generator which supplies a quite narrow pulse, the initiation of said additional pulse generator beng under the control of the trailing edge of the output pulse from the last of the first-mentioned pulse generators. This narrow pulse is combined in a logical "and" or coincidence circuit with the output pulse from the said first pulse generator. The output from the said coincidence circuit is fed to an integrating amplifier which generates the control voltage supplied to each of the first-mentioned pulse generators. This control voltage varies as a function of the time integral of the input to the integrating amplifier and serves to control the width of the output pulses from each of the first-mentioned pulse generators so that a predetermined number of pulses can be produced between adjacent basic sync pulses.

Referring to Figs. 1, 2 and 3 for a more detailed description of the invention, an arrangement is shown for generating four separate sources of sync pulses at the basic sync repetition rate but time displaced therefrom. A terminal S' is shown to indicate that a source of basic sync pulses S from sync source 10 is adapted to be connected thereto. A plurality of pulse generators 11, 12, 13 and 14 are coupled in cascade, the terminal S' being connected to pulse generator 11. The output pulses from generators 11, 12, 13 and 14 will be termed A, B, C and D pulses, respectively, and appear at terminals A', B', C' and D', respectively. As shown in Fig. 2, the basic sync pulses S have a duration T, this duration being measured from one negative edge to the next negative going edge. The negative going edge of the S pulses initiates the operation of pulse generator 11 so that an A pulse is generated whose positive going leading edge is aligned with the trailing negative going edge of the S pulse. As previously mentioned, the width of the A pulse is variable and is determined by a control voltage appearing on line 15 which may be termed the ABCD width control line. The trailing edge of the A pulse from generator 11 is used to initiate the operation of pulse generator 12 to thereby produce the B pulse. The C and D pulses are similarly produced from the trailing edges of the B and C pulses, respectively.

The D pulse from generator 14 is supplied to a pulse generator 16, the trailing edge of the D pulse being used by generator 16 to produce a rather narrow positive pulse. The adjustment of the width of the narrow pulse is accomplished by a connection to the slider of a rheostat 17. One end of the rheostat is floating and the other end is connected to a desired potential, herein illustrated as ground. This narrow pulse will be hereinafter referred to as the E pulse.

It will be apparent that the leading edge of the E pulse will be aligned with the leading edge of the next A pulse produced by the S pulse if the A, B, C and D pulses are of the proper width W to fit within the duration T. However, due to the slight variations in the duration T caused by the source supplying the synchronizing pulses S, the A, B, C and D pulses will not always fit within the duration T. For example, if T increases, there will initially be a slight delay between the end of the D pulse and the beginning of the A pulse. If T decreases, the A pulse will begin before the D pulse ends. Since it is desired to have the A, B, C and D pulses fit as closely as possible within the duration T, it is necessary to vary the A, B, C and D pulse widths dynamically to assure such a fit. This is accomplished in a manner now to be described.

A logical "and" or coincidence circuit 18 is arranged to receive the A pulses from generator 11 and the E pulses from generator 16 so as to produce as an output A+E pulses which are of a duration equal to the time during which there is a coincidence of the A and the E pulses. The A+E pulses are fed to an integrating amplifier 19 which produces a variable control voltage therefrom.

As shown in Fig. 3, the A+E overlap is plotted along the abscissa in microseconds and the width control voltage is plotted along the ordinate in volts. To one side of the curve 20, two vertically extending plots are made. One plot is for A, B, C and D pulse width W and the other is for the duration T, both of said plots being in microseconds. Since it is desirable to work in the linear range of the curve 20, the circuit parameters are designed such that a duration T of eight microseconds will be considered normal or average. Thus, the circuit will normally operate at the approximate mid-point of curve 20. If the period T should increase to ten microseconds, then the A+E overlap would increase to just under one-tenth microsecond and the control voltage would decrease to approximately +75 v. D. C. The A, B, C and D pulse width W would increase to two and one-half microseconds.

The details of the circuits shown in block diagram form in Fig. 1 will now be described. The pulse generator shown in Fig. 4 is exemplary of the type of generator which may be used for generators 11 through 14. Basically, this circuit comprises a normally conducting triode 21 whose grid is connected through resistors 22 and 23 to the pulse width control voltage existing on line 15. The input pulse to the generator may be considered a positive pulse which is coupled by way of a capacitor 24 to a point between resistors 22 and 23. The cathode of triode 21 is connected to a negative D. C. potential, herein illustrated as −75 v. D. C. The positive going leading edge of the input pulse has little effect on the conductive state of triode 21 since it is normally fully conducting. However, when the negative going trailing edge of the input pulse occurs, the grid of tube 21 is dropped below the cathode potential to cut the tube off. This allows the plate to rise and through a resistor 25 apply such a potential to the grid of a triode 26 as to turn the triode on, the last-named triode being normally approaching cutoff by the fact that its grid is held down by the plate of triode 21. The cathode of triode 26 is connected to an output terminal 27 which is clamped by diodes 28 and 29 so that it cannot drop below ground or rise above +40 v. D. C., respectively. The plate of triode 21 is also connected to this output terminal through a resistor 30 while the plate of triode 26 is connected through a resistor 31 to a positive source of D. C. potential, herein illustrated as +115 v. D. C.

When triode 26 goes into conduction, the plate thereof drops and supplies a negative transient voltage through a capacitor 32 and resistor 22 to the control grid of triode 21, thereby reinforcing the cutoff of triode 21.

The time constant fixed by capacitor 24 and resistor 23 determines the rate at which the voltage at the grid of triode 21 rises after reaching its most negative state, and the magnitude of the control voltage determines the length of time it takes for said grid to rise to a level where the triode can turn on again. Thus, the magnitude of the control voltage determines the width of the pulse produced at the output terminal 27.

When triode 21 begins conduction, the plate thereof drops sharply and drives triode 26 near cutoff. As the plate of triode 26 rises it supplies a positive reinforcing transient voltage to the control grid of triode 21.

Figure 5:
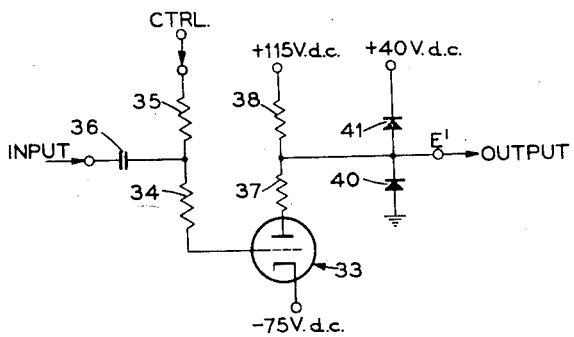

The narrow pulse generator 16 could be identical with the circuit shown in Fig. 4. However, it has been found that the drive obtained from the use of triode 26 is unnecessary for this circuit. Therefore, the circuit shown in Fig. 5 is used to generate the narrow E pulses. This generator comprises a triode 33 whose control grid is connected to the slider of rheostat 17 through resistors 34 and 35. The input pulse from generator 14 is coupled to a point intermediate the last-named resistors by means of a capacitor 36. The cathode of this triode is connected to a potential of −75 v. D. C. and the plate is connected to a potential of +115 v. D. C. through resistors 37 and 38. An output terminal E' is connected to a point between resistors 37 and 38 and is clamped so that it cannot go below ground or go above +40 v. D. C. by the action of diodes 40 and 41, respectively.

Triode 33 is normally conducting fully so that the leading edge of the positive input pulse thereto has little effect on the current flow therethrough. When the trailing edge of the input pulse occurs, the grid of triode 33 is driven below the cathode and the tube is cut off. After the grid bottoms, it begins rising at a rate determined by the time constant of capacitor 36 and resistor 35. The time required for the tube to return to conduction is determined by the control potential picked from rheostat 17.

Fig. 5 shows the details of the "and" or coincidence circuit 18 and the integrating amplifier 19, both of which were shown in block form in Fig. 1. Circuit 18 is shown to comprise diodes 42 and 43, the cathodes of these diodes being connected to terminals A' and E', respectively, for receiving the A and E pulses, respectively. The plates of the diodes are commoned and connected through a resistor 44 to +115 v. D. C. The commoned plates are also coupled by means of a capacitor 45 and a resistor 46 to the control grid of a triode 47. A point between capacitor 45 and resistor 46 is connected through resistor 48 to a grid-bias potential, herein illustrated as —90 v. D. C. This potential normally keeps triode 47 cut off since its cathode is at —75 v. D. C.

When a coincidence occurs between the A and E pulses, a pulse is produced which is equal in time to the duration of said coincidence. This pulse will be sufficient to raise the grid of triode 47 and turn the tube on. The plate of triode 47 is connected to ground potential through resistors 49 and 50. Thus, the variations in grid voltage will cause variations in the potential at the plate.

The output from triode 47 is taken from between resistors 49 and 50 and supplied through resistors 51 and 52 to the left and right control grids of a duo-triode 53, respectively. The cathodes of both sides of duo-triode 53 are commoned and connected to ground while the plates of both sides are commoned and connected to +250 v. D. C. through a resistor 54. The commoned plates are also coupled back to the midpoint between resistors 49 and 50 by means of a capacitor 55. The potential existing on the commoned plates is used as the control voltage for line 15.

Figure 6:
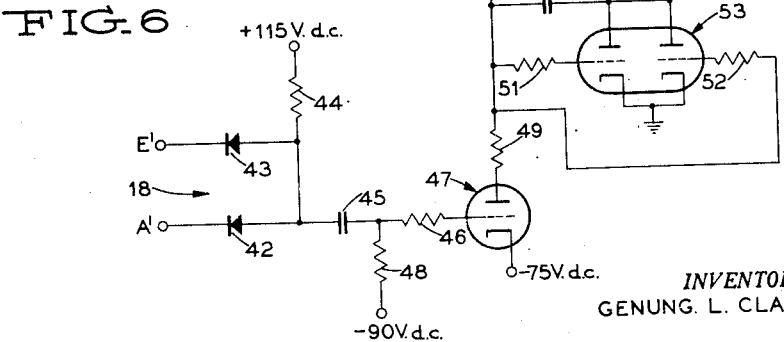
Fig. 6 is a schematic diagram of the integrating amplifier and associated circuitry shown in block diagram form in Fig. 1.

The operation of integrators such as the one described is well known. Briefly however, the width of the A+E pulses, i. e., the pulse produced by a coincidence of the A and E pulses, determines the period of time triode 47 conducts during one period T. By referring to Fig. 3 it will be seen that as A+E increases the control voltage increases. This relationship is apparent from Fig. 6. As the width of the A+E pulses increase, the input potential to the grids of the duo-triode 53 from the tapped plate output of triode 47 decreases in magnitude. This causes the commoned plates of the duo-triode to rise in potential as required. Since the control voltage is rising, the width of the pulses produced from generators 11 through 14, decreases.

For the circuits shown, the nominal basic sync repetition rate produces a period T which is equal to eight microseconds and the width W of each of the A, B, C and D pulses will be two microseconds in duration. The A+E overlap will be approximately 0.15 microsecond in duration and the control voltage will be approximately +125 v. D. C. If the period T should begin to increase, for example, due to a decrease in velocity of the drum supplying the basic sync pulses, the A+E overlap will decrease. This is due to the fact that the E pulse begins before the A pulse. As A+E decreases the output control potential from the integrating amplifier decreases. It will be remembered from the description of Fig. 4 that as the control potential decreases, the A, B, C and D pulse width W increases.

The above operation is substantiated by the curve in Fig. 3 which shows that as A+E decreases, time T and width W increase and the control voltage decreases. Just the opposite of the above occurs when the drum supplying the sync pulses increases in velocity.

Typical values of the components for the particular embodiment shown and described are as follows, the value of the resistors being stated in kilohms and the value of the capacitors being stated in micro-microfarads.

Resistor 22 ———————————————— 10K
Resistor 23 ———————————————— 300K
Resistor 25 ———————————————— 1K
Resistor 30 ———————————————— 1K
Resistor 31 ———————————————— 1K
Resistor 34 ———————————————— 10K
Resistor 35 ———————————————— 10K
Resistor 37 ———————————————— 2.7K
Resistor 38 ———————————————— 15K
Resistor 44 ———————————————— 100K
Resistor 46 ———————————————— 10K
Resistor 48 ———————————————— 100K
Resistor 49 ———————————————— 2.7K
Resistor 50 ———————————————— 47K
Resistor 51 ———————————————— 10K
Resistor 52 ———————————————— 10K
Resistor 54 ———————————————— 12K
Capacitor 24 ——————————————— 50 mmf.
Capacitor 32 ——————————————— 10 mmf.
Capacitor 36 ——————————————— 50 mmf.
Capacitor 45 ——————————————— 100 mmf.
Capacitor 55 ——————————————— 10,000 mmf.

From the above-detailed description, it will be appreciated that I have provided an electrical circuit arrangement for generating a plurality of pulses occurring during predetermined percentages or portions of a sync period, even though the sync period is susceptible to variation. While the pulse generators for the A, B, C and D pulses are illustrated to produce equal width pulses during a cycle, it is obvious that certain ones of the generators could be furnished with different RC time constants to furnish different width pulses. Thus, the generators would still be under the control voltages and the pulses would occur during different predetermined portions of a cycle. The present circuit is in fact superior to the use of separate sync tracks on a drum for supplying the A, B, C and D pulses furnished by the present invention. Where the syncs are all obtained from a drum, it is not unusual for there to be a discrepancy between the timing of the different sync pulses. This discrepancy may be due to different characteristics in the magnetic reading heads for the different tracks and the amplifiers required to amplify the signals produced. In addition, the present circuit is much more economical and provides more room on the drum for storage.

While specific pulse generator and integrating amplifier circuits have been shown, it is apparent that other forms of these circuits could be utilized, it being important however that such other circuits be able to function to produce the results furnished by the illustrated circuits.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. An electrical circuit comprising means for receiving a series of input pulses having a cycle time susceptible to variation, said means being responsive to said input pulses for producing a plurality of output pulses during said cycle time, each of said output pulses occurring during different portions of said cycle time, and means coupled to the first-named means for producing a control signal which is utilized by said first-named means for maintaining the occurrence of said output pulses during substantially fixed portions of said cycle time even though said cycle time varies.

2. An electrical circuit comprising pulse generator means for generating a plurality of output pulses from each of a plurality of recurring input pulses, said input pulses having a cycle time which is susceptible to variation, said output pulses occurring during different portions of said cycle time, and control means coupled to said pulse generator means for supplying a control signal to said pulse generator means for maintaining said portions substantially fixed even though said cycle time varies.

3. A timing circuit for generating a plurality of timing pulses from a plurality of recurring pulses, the cycle time of said recurring pulses having a normal duration, pulse generator means responsive to said recurring pulses for generating a plurality of successive timing pulses during said cycle time, and means coupled to said pulse generator means for maintaining the termination of the last of said timing pulses for one cycle substantially coincident with the beginning of the first of said timing pulses for the next cycle as said cycle time varies from said normal duration.

4. An electrical circuit comprising pulse generator means for generating a plurality of output pulses from each of a plurality of recurring input pulses, said input pulses having a cycle time which is susceptible to variation, said output pulses occurring during different portions of said cycle time, and control means responsive to the last of said output pulses during one cycle time and to the first of said output pulses during a following cycle time for producing a control signal which is supplied to said pulse generator means, said control signal being used by said pulse generator means to vary the duration of said output pulses as said cycle time varies.

5. A timing circuit for generating a plurality of timing pulses from a plurality of recurring pulses, the cycle time of said recurring pulses having a normal value which may change, pulse generator means responsive to said recurring pulses for generating a plurality of successive timing pulses during said cycle time, and means coupled to said pulse generator means responsive to a timing pulse produced during one cycle and a timing pulse produced during an adjacent cycle for supplying a control signal to said pulse generator means for maintaining the termination of the last of said timing pulses for one cycle substantially coincident with the beginning of the first of said timing pulses for the next cycle.

6. An electrical circuit for generating a plurality of timing pulses during each cycle time of a plurality of sync pulses obtained from a record medium which is subject to velocity variations, said timing pulses being generated during different portions of said cycle time, pulse generator means responsive to each of said sync pulses for generating said timing pulses, and control means coupled to said pulse generator means for causing each of certain of said output pulses to be delayed for a variable time interval from the beginning of said cycle time as the velocity of said record medium varies.

7. An electrical circuit comprising pulse generator means for generating a plurality of output pulses from each of a plurality of recurring input pulses, said input pulses having a cycle time which is susceptible to variation, said pulse generator means comprising a plurality of cascade connected pulse generators, the first of said generators producing an output pulse in response to each of said input pulses, the remaining ones of said generators each producing an output pulse in response to the output pulse from the pulse generator immediately preceding it, an additional pulse generator means connected to receive the output pulse from the last of said cascade connected pulse generators for producing a narrow pulse, and means responsive to the duration of coincidence of said narrow pulse and the output pulse from said first generator for supplying a control voltage to each of said cascade connected generators for maintaining the occurrence of each of said output pulses during a fixed portion of said cycle time even though said cycle time varies.

8. An electrical circuit comprising pulse generator means for generating a plurality of output pulses from each of a plurality of recurring input pulses, said input pulses having a cycle time which is susceptible to variation, said output pulses occurring during different portions of said cycle time, an additional pulse generator for producing a fixed duration pulse at the end of the last of said output pulses in response to one of said output pulses, and control means responsive to said fixed duration pulse and the first of said output pulses during a cycle for generating a control voltage, and means for supplying said control voltage to said pulse generator means for maintaining said portions substantially fixed even through said cycle time varies.

9. An electrical circuit comprising pulse generator means for generating a plurality of output pulses from each of a plurality of recurring input pulses, said input pulses having a cycle time which is susceptible to variation, said output pulses occurring during different portions of said cycle time, an additional pulse generator for producing a fixed duration pulse at the end of the last of said output pulses in response to one of said output pulses, and means including integrating means connected to receive said fixed duration pulse and the first of said output pulses during a cycle and responsive to the duration of coincidence thereof for supplying a control voltage to said pulse generator means in a manner to increase or decrease the duration of each of said output pulses as said cycle time respectively increases or decreases.

10. A timing circuit for generating a plurality of timing pulses from a plurality of recurring pulses, the cycle time of said recurring pulses having a normal value, pulse generator means responsive to said recurring pulses for generating a plurality of successive timing pulses during said cycle time, and control means coupled to said pulse generator means for maintaining the termination of the last of said timing pulses for one cycle substantially coincident with the beginning of the first of said timing pulses for the next cycle as said cycle time varies from said normal value.

11. A timing circuit for generating a plurality of timing pulses from each of a plurality of recurring pulses, the cycle time T of said recurring pulses having a normal value, a plurality of cascade connected pulse generator means each of which produces one of said timing pulses of a time W, the first of said pulse generator means being initiated to produce a timing pulse by a recurring pulse, and means coupled to each of said pulse generator means for varying the time W of each of the timing pulses for a cycle as the time T varies from said normal value such that the last of said timing pulses for one cycle terminates substantially coincident with one edge of a recurring pulse.

No references cited.